United States Patent
Winn et al.

(10) Patent No.: US 10,430,715 B1
(45) Date of Patent: Oct. 1, 2019

(54) PREDICTIVE MODELING SYSTEM FOR A MULTI-USER CAX ENVIRONMENT

(71) Applicant: United Technologies Corporation, Hartford, CT (US)

(72) Inventors: Joshua Daniel Winn, Ellington, CT (US); Charles Gregory Jensen, Provo, UT (US); Robert Ivan Yorgason, Provo, UT (US)

(73) Assignee: United Technologies Corporation, Farmington, CT (US)

( * ) Notice: Subject to any disclaimer, the term of this patent is extended or adjusted under 35 U.S.C. 154(b) by 847 days.

(21) Appl. No.: 14/961,127

(22) Filed: Dec. 7, 2015

Related U.S. Application Data

(60) Provisional application No. 62/092,864, filed on Dec. 17, 2014.

(51) Int. Cl.
| | |
|---|---|
| *G06N 5/04* | (2006.01) |
| *G06F 17/50* | (2006.01) |
| *H04L 29/08* | (2006.01) |
| *H04L 29/06* | (2006.01) |

(52) U.S. Cl.
CPC .............. *G06N 5/04* (2013.01); *G06F 17/50* (2013.01); *H04L 67/1097* (2013.01); *H04L 67/42* (2013.01)

(58) Field of Classification Search
CPC ......... A63F 13/335; G06N 5/04; G06F 17/50; H04L 67/42; H04L 67/1097
See application file for complete search history.

(56) References Cited

U.S. PATENT DOCUMENTS

| | | | |
|---|---|---|---|
| 6,415,317 B1* | 7/2002 | Yelon | A63F 13/12 709/205 |
| 8,229,715 B1 | 7/2012 | Teller et al. | |
| 2012/0110595 A1* | 5/2012 | Reitman | G06F 17/50 719/313 |
| 2012/0192096 A1* | 7/2012 | Bowman | G06F 3/0481 715/780 |
| 2013/0144566 A1 | 6/2013 | De Biswas | |
| 2014/0149882 A1 | 5/2014 | Nysetvold et al. | |
| 2014/0222387 A1 | 8/2014 | Cannon et al. | |
| 2014/0222919 A1 | 8/2014 | Nysetvold et al. | |
| 2014/0236550 A1 | 8/2014 | Nysetvold et al. | |

OTHER PUBLICATIONS

Red, Edward, et al. "v-cax: A research agenda for collaborative computer-aided applications." Computer-Aided Design and Applications 7.3 (2010): 387-404. (Year: 2010).*

(Continued)

*Primary Examiner* — Li B. Zhen
*Assistant Examiner* — Markus A. Vasquez
(74) *Attorney, Agent, or Firm* — Carlson, Gaskey & Olds, P.C.

(57) ABSTRACT

A system for facilitating multi-user computer aided design includes a plurality of locally stored multi-user design (CAx) environments. A server includes a server side CAx environment. The server is communicatively coupled to each of the locally stored CAx environments. The server side CAx environment further includes a predictive modeling module operable to receive an incomplete command from a first user, and predict a complete command based on the incomplete command.

17 Claims, 4 Drawing Sheets

(56) References Cited

OTHER PUBLICATIONS

Xu, Yue, A Flexible Context Architecture for a Multi-User GUI, Thesis, Dec. 2010, Department of Mechanical Engineering, Brigham Young University.
Red, Edward, David French, Ammon Hepworth, Greg Jensen, and Brett Stone, Multi-User Computer-Aided Design and Engineering Software Applications, Cloud-Based Design and Manufacturing (CBDM), Jan. 1, 2014, pp. 25-62, Springer International Publishing.
Red, Edward, Greg Jensen, Jordan Ryskamp, and Kenneth Mix, NXConnect: Multi-User CAx on a Commercial Engineering Software Application, Department of Mechanical Engineering, Brigham Young University. 2010 PACE Global Annual Forum.

\* cited by examiner

US 10,430,715 B1

PREDICTIVE MODELING SYSTEM FOR A MULTI-USER CAX ENVIRONMENT

CROSS-REFERENCE TO RELATED APPLICATION

This Application claims priority to U.S. Provisional Application No. 62/092,864 filed Dec. 17, 2014.

BACKGROUND

This disclosure relates to computer-aided technologies (CAx), and more particularly, to visualization of component designs in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

In one exemplary embodiment a system for facilitating multi-user computer aided design includes a plurality of locally stored multi-user design (CAx) environments. A server includes a server side CAx environment. The server is communicatively coupled to each of the locally stored CAx environments. The server side CAx environment further includes a predictive modeling module operable to receive an incomplete command from a first user, and predict a complete command based on the incomplete command.

Another exemplary embodiment of the above-described system, further includes a command processing module operable to interface a command from a local CAx environment with the predictive modeling module.

In another exemplary embodiment of any of the above-described systems, the command processing module further includes instructions operable to convert a command from a first CAx environment to a command compatible with a server side CAx environment.

In another exemplary embodiment of any of the above-described systems, at least one of the local CAx environments is a different CAx environment from the server side CAx environment.

In another exemplary embodiment of any of the above-described systems, the server side CAx environment includes a collaborative part file. Each locally stored CAx environment in the plurality of locally stored CAx environments includes a visual representation of the collaborative part file.

In another exemplary embodiment of any of the above-described systems, the visual representation of the collaborative part file omits at least some parameters associated with the collaborative part file.

In another exemplary embodiment of any of the above-described systems, an output translation module connects each of the locally stored CAx environments with the collaborative part file. The output translation module is operable to determine the visual representation of the collaborative part file.

In another exemplary embodiment of any of the above-described systems, the server side CAx environment includes a set of default parameters corresponding to each possible command.

In another exemplary embodiment of any of the above-described systems, the server side CAx environment includes set of learned parameters corresponding to each possible command. The set of learned parameters is based on frequently used parameters.

In another exemplary embodiment of any of the above-described systems, at least one of the locally stored CAx environments is directly connected to the server side CAx environment.

In another exemplary embodiment of any of the above-described systems, at least one of the locally stored CAx environments is connected to the server side CAx via a network connection.

In another exemplary embodiment of any of the above-described systems, the server includes at least a processor and a tangible, non-transitory, memory. The tangible, non-transitory, memory stores instructions operable to cause the processor to implement the server side CAx environment.

An exemplary method for reducing lag in a multi-user design (CAx) environment includes predicting at least one parameter of a command using a processor. The command originating from a local computer of the first user, with the local computer of the first user being distinct from the processor, thereby determining a predicted command and performing an action on a collaborative part file using the processor based on the predicted command.

A further example of the above exemplary method includes adjusting the predicted command based on at least one subsequently received actual parameter from the first user, and adjusting the performed action based on the subsequently received actual parameter.

A further example of any of the above exemplary methods includes propagating a representation of the collaborative part file to each of a plurality of users when all actual parameters corresponding to the command have been received.

A further example of any of the above exemplary methods includes propagating a representation of the collaborative part file to each of a plurality of users comprises propagating a visual representation. The visual representation includes less than all parameters of the collaborative part file.

A further example of any of the above exemplary methods includes providing a user with at least one omitted parameter in the visual representation in response to the user initiating an action requiring the at least one omitted parameter.

A further example of any of the above exemplary methods includes deleting a result of the predicted command prior to receiving a final actual parameter in response to receiving a cancel command from the first user.

A further example of any of the above exemplary methods includes predicting at least one parameter of a command originating from a first user comprises accessing one of a set of default parameters and a set of learned parameters corresponding to the command originating from the first user.

An exemplary method for reducing lag in a multi-user design (CAx) system includes receiving a partial command from a locally stored user CAx environment at a server side CAx environment, predicting omitted parameters of the partial command, thereby determining a predicted resultant action in response to the partial command, altering a collaborative part file in the server side CAx environment according to the predicted resultant action, modifying the predicted omitted parameters in response to a received actual parameter thereby determining a new predicted resultant action and altering the collaborative part file in the server side CAx environment according to the new predicted resultant action. The step of modifying the predicted omitted parameters in response to a received actual parameter thereby determines a new predicted resultant action and altering the collaborative part file in the server side CAx environment according to the new predicted resultant action until all omitted parameters have been replaced with actual parameters, and propagating a visual representation of the resultant collaborative file to each of a plurality of locally stored user CAx environments.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
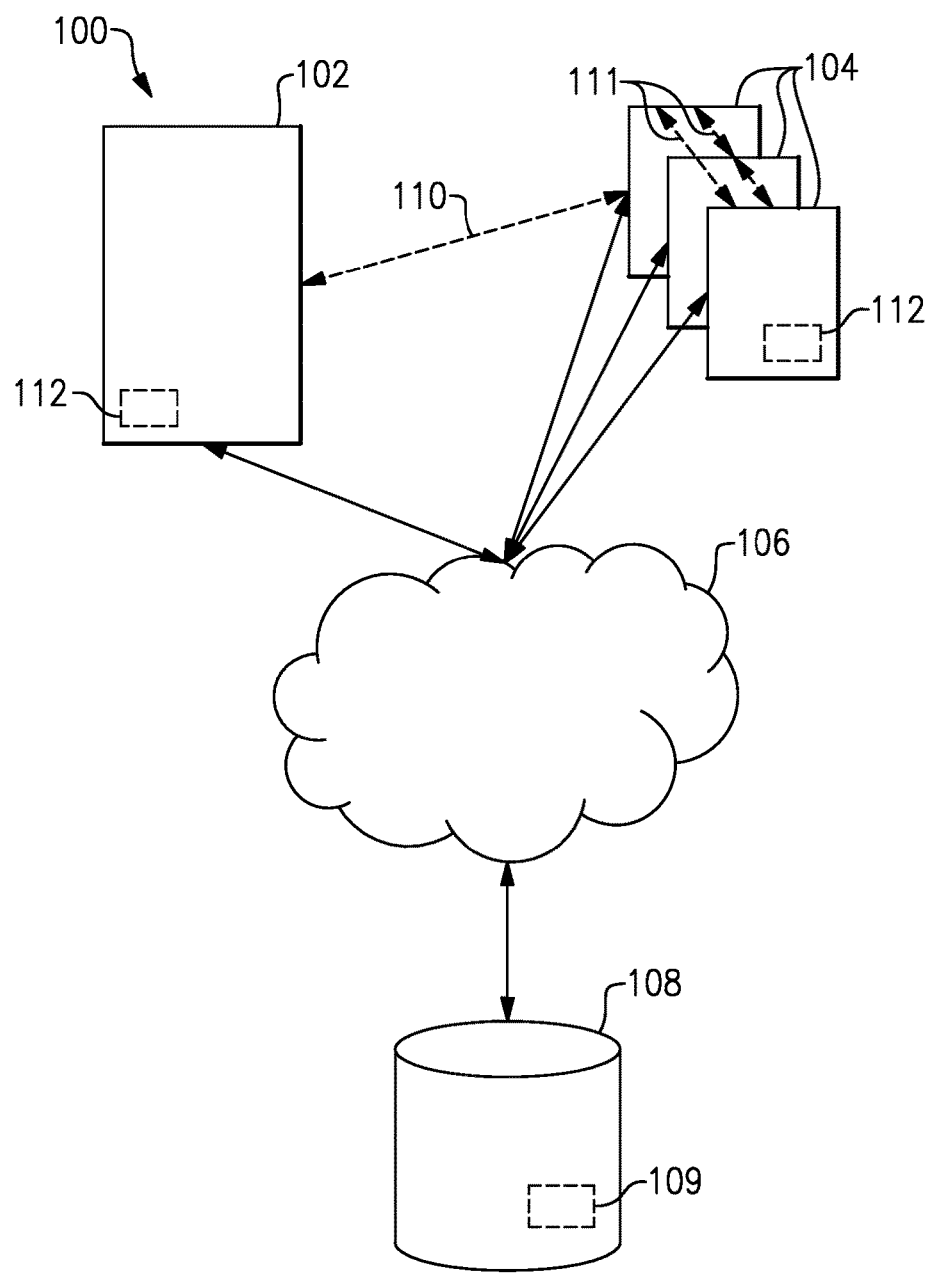
FIG. 1 illustrates a system for a multi-user CAx environment, according to an embodiment.

FIG. 1 illustrates an example computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one example, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some examples. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device.

In some examples, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some examples, the CAx package is configured to communicate with the host computer 102 either over the network 106 or directly through the direct client interface 110. In another example, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another example, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In other embodiments, each feature, feature type, part, component design, sub-assembly and assembly corresponds to a unique identifier or database entry. In some embodiments, the database 109 is linked or otherwise corresponds to multiple part files. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, spatial position and orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some examples are provided by the CAx software as default layer(s). In other embodiments, a user manually selects feature(s) and/or feature type(s) to be associated with at least one layer. In some embodiments, each layer is defined at system initialization, and in other examples, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to view and modify various aspects of a component design corresponding to one or more part files. In some embodiments, the part file is stored locally at the storage system 108, with local copies of the part file at the client computers 104 being synchronized periodically. Modifications to each part file are communicated to each CAx environment 112 currently accessing the part file, either in real-time or periodically utilizing a synchronization scheme. Display or visualization of the modification is therefore made substantially immediately available in CAx environments 112 accessing the same part file, which can assist the multiple users in reducing, identifying/or and resolving conflicts or inconsistencies in various aspects of a component design, thereby ensuring that a particular design intent is met.

Figure 2A:
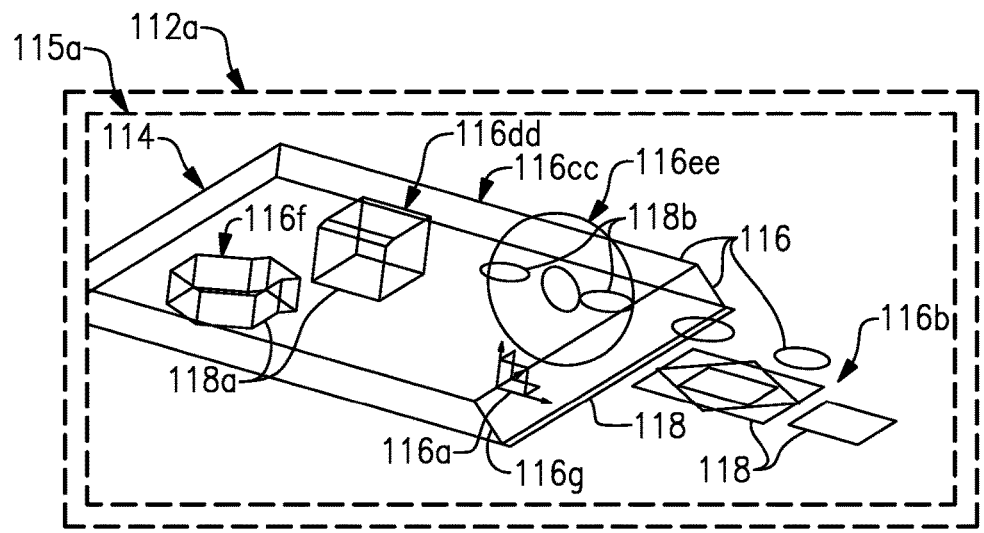
FIG. 2A illustrates a sample component design displayed in a first CAx environment, according to an embodiment.
Figure 2B:
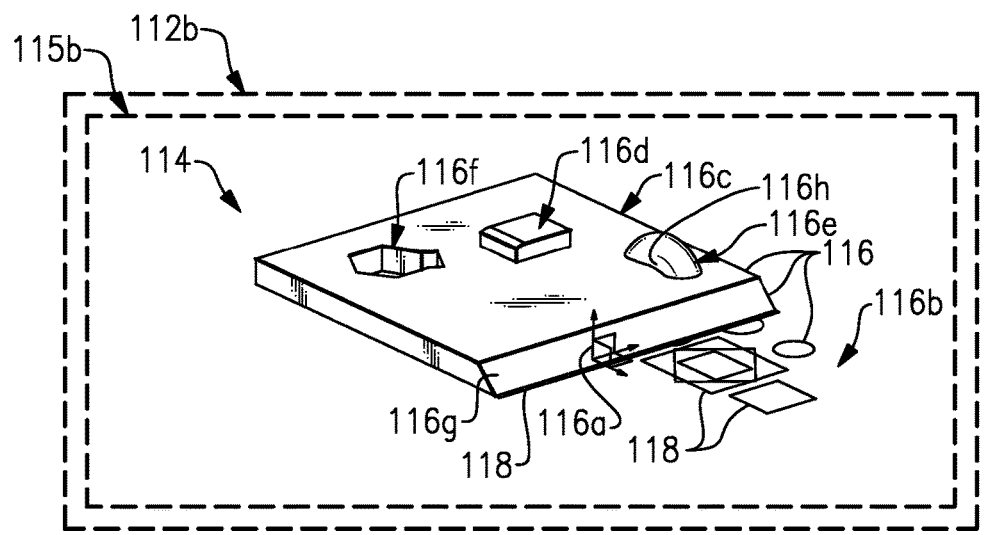
FIG. 2B illustrates the sample component design of FIG. 2A displayed in a second CAx environment, according to an embodiment.

FIGS. 2A-2B illustrate one example in which two users collaborate on various aspects of a component design 114. In this example, a first user is provided with a first CAx environment 112a, and a second user is provided with a second CAx environment 112b, shown in FIGS. 2A-2B respectively. Each of the CAx environments 112a, 112b is associated with a different one of the client computers 104, for example.

The example component design 114 includes one or more features 116 each corresponding to a feature type. The features 116 shown in FIG. 2A include a datum coordinate system 116a, and a sketch 116b having one or more sketch entities or geometries 118 illustrated as ellipses and rectangles, for example. Some features 116 shown in FIG. 2B include solids such as extrudes 116c, 116d, which are applied to geometries 118 of the sketch 116b and are characterized by wireframes 116cc, 116dd shown in FIG. 2A. Other example features include a hole or Boolean 116f forming an opening in the extrude 116c, and a chamfer 116g applied to extrude 116c. Non-geometric features include surface shading 116h (shown in FIG. 2B) applied to the rotate 116e feature.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112a, 112b. As illustrated by the CAx environment 112a in FIG. 2A, the user has selected one or more visualization settings to show the wireframe geometries 116cc, 116dd, 116ee and to hide the corresponding solid features 116c, 116d, 116e. In the CAx environment 112b shown in FIG. 2B, the user has selected one or more visualization settings to show solid features 116c, 116d, 116e and to hide wireframes 116c, 116d, 116f, for example. The visualization settings of each CAx environment 112 can be customized according to the needs of a particular situation even though each of the users is working on the same component design 114.

When multiple users are working on the same aspect of a component design 114, or different elements of a single part in a collaborative part file each user may be interested in making changes to one or more features of the part file. When making such a change a user enters a command, such as extrude, on their locally running CAx environment. The locally running CAx environment then performs the command, and transmits the command to each other user. In some examples the command is transmitted to each other user through a server. Once each other user has received the command, a locally operating CAx environment at each other user performs the command on their locally part. The local parts can then all be synchronized, through the server, to ensure that each user is operating from the same component.

When configured in this manner, significant lag time can be introduced between a user entering a command or a feature alteration and that command or feature alteration being fully propagated to each user working in the collaborative session.

Figure 3A:
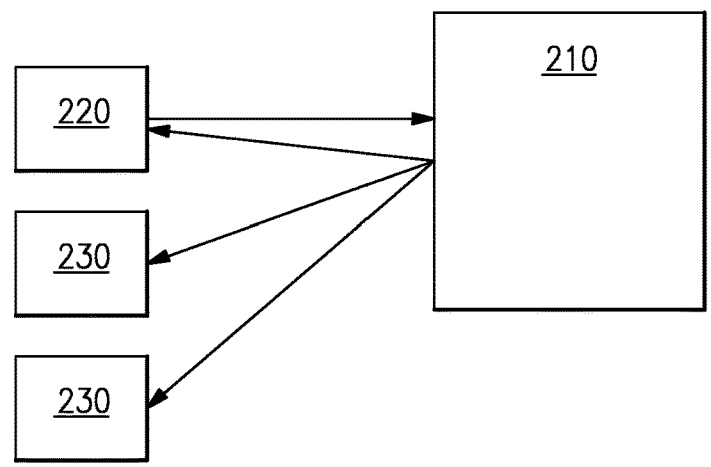
FIG. 3A illustrates a top level view of multiple users engaged in a collaborative design session using a CAx environment.

FIG. 3A illustrates a top level view of multiple users 220, 230 engaged in a collaborative design session using a server based CAx environment 210, according to an embodiment. In the example of FIG. 3A, a first user 220 enters a command or begins altering a feature of the component being worked on in the collaborative session. As the first user 220 enters the command or alteration, the command or alteration is transmitted to the server based CAx environment 210. After receiving the initial command, and before receiving all the parameters of the initial command, the server side CAx environment 210 begins altering the component file according to the command using a predictive alteration module. The predictive alteration module utilizes a set of predictive parameters to create an initial alteration. As specific actual parameters on the command are received from the user 220, the predicted parameters are adapted to correspond to the actual received parameters.

In this manner, the server side CAx environment 210 significantly reduces the time required to propagate the end result of the command from the user 220 to the other users 230. Once all the specific parameters have been received, and implemented, by the server side CAx environment 210, the end result is propagated to each user 220, 230 in the collaborative session.

In some examples, to further reduce the lag time between the first user 220 entering a command and the results of that command being propagated to all the users 220, 230, the information provided to any given CAx environment on a user 220, 230 side is limited to the necessary information required to display the geometry or view being examined by the user 220, 230. If a particular command, or action of a user 220, 230 requires additional information about the component from the server side CAx environment 210, the user 220, 230 side CAx environment queries the server side CAx environment 210 for the specific information needed. This information is then provided to the user 220, 230 side CAx environment and the user 220 can enter the command.

Figure 3B:
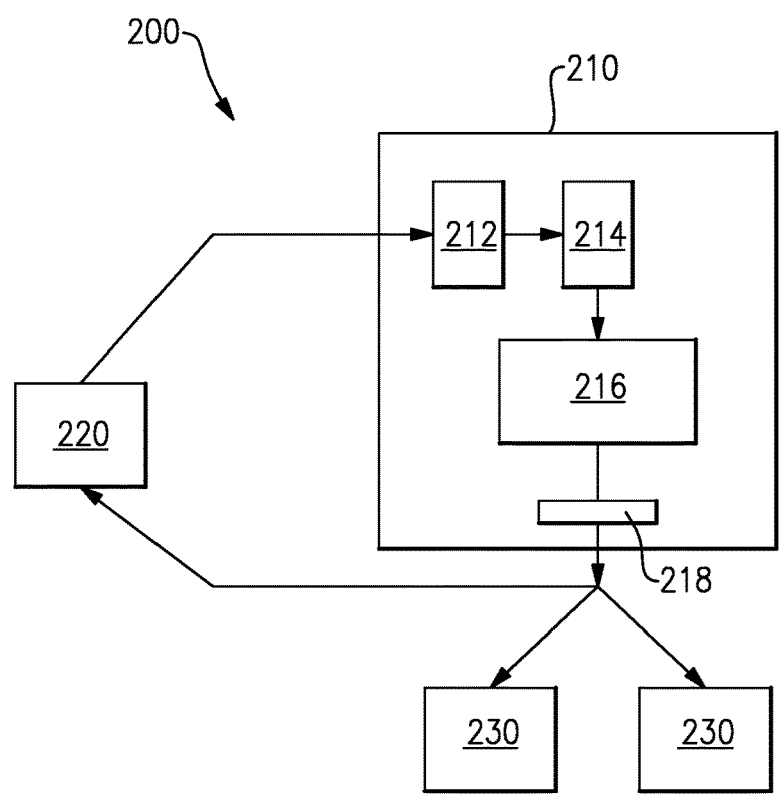
FIG. 3B illustrates a predictive modeling scheme for the collaborative design session of FIG. 3A.

FIG. 3B illustrates a predictive modeling arrangement within a CAx environment 210 for the collaborative design session 200 of FIG. 3A. As described above, with regards to FIG. 3A, a first user 220 enters a command into a local CAx environment participating in the collaborative session 200. Each command includes multiple parameters that define the specific action to be performed as a result of the command. When the user 220 begins entering the command, an initial command signal is transmitted from the local CAx environment corresponding to the user 220 to a server side CA environment 210. The command transmission can be via a direct connection or via a network connection or other means of transmission, depending on the physical configuration of the system 100 (illustrated in FIG. 1).

The initial command signal 220 is received at a command processing module 212 in the server side CAx environment 210. The command processing module 212 accepts the command from the local CAx environment of the user 220. If the user 220 is utilizing a different design tool within the local CAx environment than the design tools in the server side CAx environment, the command processing module 212 converts the command into a command form usable by the server side CAx environment 210.

Once the initial command is processed, the command processing module 212 passes the command to a predictive modeling module 214. The predictive modeling module 214 receives the currently known parameters for the command, and utilizes software to determine an expected value for any currently unknown parameters.

By way of an example, if the user 220 enters an extrude command on a feature, the command processing module 212 receives the command before all the parameters such as the length and angle of the extrude are input by the user 220. The command processing module provides the incomplete command to the predictive modeling module 214 and the predictive modeling module 214 provides predicted parameters based on the command and the currently known parameters.

In some embodiments, the predicted parameters are a set of default parameters corresponding to each possible command with the set of default parameters being stored in a server side database or being stored in a database accessible by the server. In alternative embodiments, the predicted parameters can be a set of learned parameters based on frequently used parameters that have been previously applied, or generated using a prediction algorithm.

The predictive modeling module 214 then applies the command, including the predicted parameters, to a collaborative part file 216 open in the server side CAx environment 210. As actual parameters are entered by the user 220, and are received at the command processing module 212, the command processing module 212 updates the predictive modeling module 214 with the actual parameters.

The predictive modeling module 214 then updates the predicted command based on the received actual parameters. The updated predicted command is then applied to the collaborative part file 216. This process is reiterated until a full set of actual parameters is received and implemented in the predictive modeling module 214 and the collaborative part file 216 reflects the final command.

If the command is canceled at any point prior to all the parameters being received by the predictive modeling module 214, all changes applied to the collaborative part 216 as a result of the command are erased.

Once the final command has been applied to the collaborative part 216, an output translation module 218 outputs a visual representation of the modified collaborative part file 216 to each user 220, 230. The local CAx environment at each user 220, 230 then updates the locally displayed visual representation to correspond with the received visual representation. In some embodiments, the actual parameters are compared to the prediction and the results are used to improve future predictions.

In some embodiments, in order to further reduce lag between the initial input of a command and the display of the resultant action in the local CAx environment of each user 220, 230, the data for the visual representation does not include full schematic details and parameters of the displayed part. Rather, only the details need to display the current view of the collaborative part 216 are provided to a given user 220, 230. If a user 220, 230 wishes to change views, or enter a command that requires additional details or parameters of the current collaborative part 216, the local CAx environment of the user 220, 230 wishing to enter the command polls the output translation module 218 to receive the missing parameters.

Figure 4:
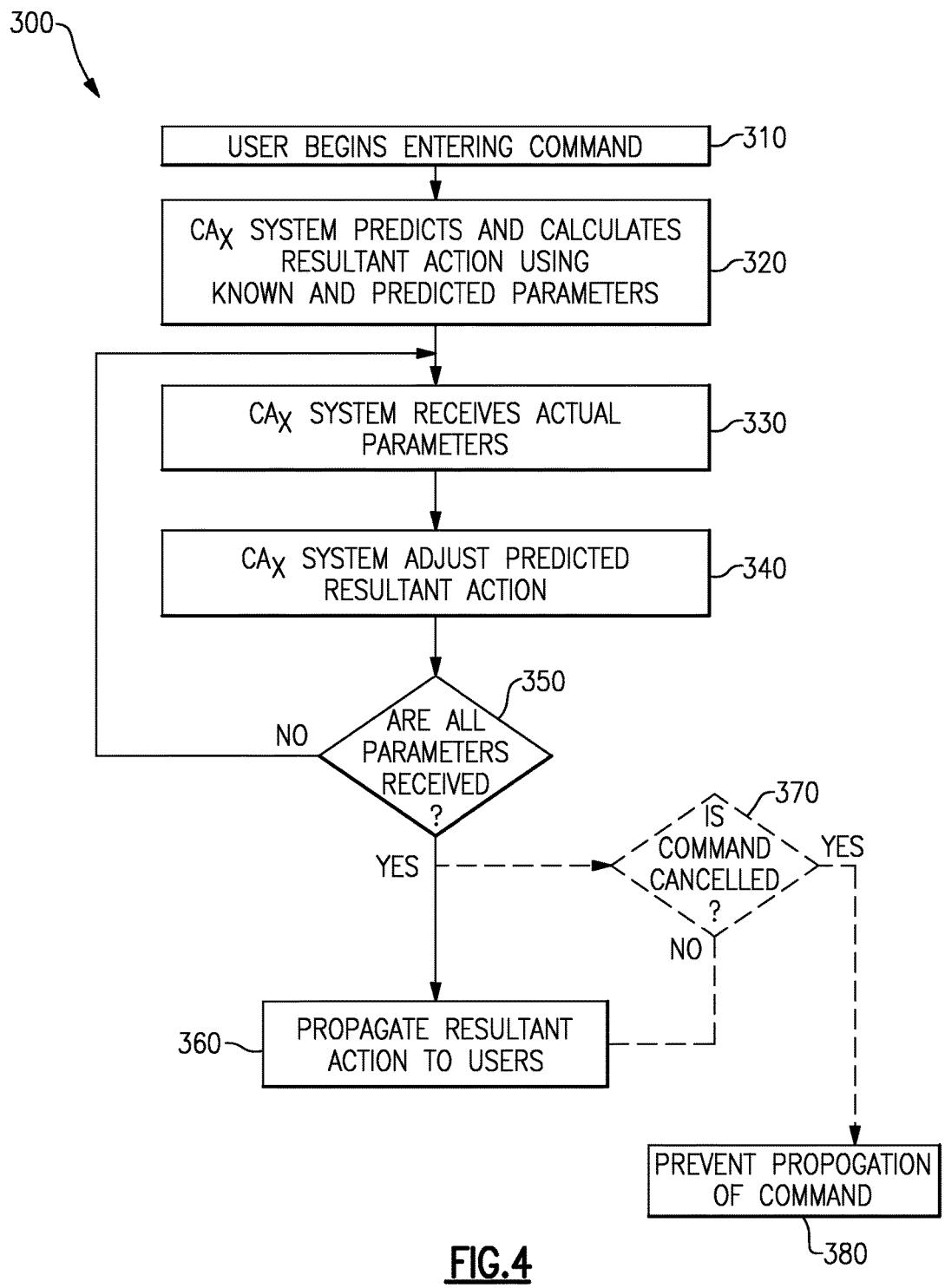
FIG. 4 illustrates a process for implementing predictive design systems into a CAx environment.

In the illustrated CAx system 200 the lag created as a result of modeling a command on a local CAx environment, transmitting the command to each other local CAx environment, replicating the command at each other local CAx environment, and then synching all the local CAx environments together is minimized With continued reference to the example CAx environment of FIGS. 3A and 3B, FIG. 4 illustrates a flowchart demonstrating a predictive modeling method 300 implemented in the CAx system 200, and described above.

Initially, the originating user 220 begins entering a command in a "User Begins Entering Command" block 310. As the user 220 begins entering the command, the local CAx environment in which the user 220 is working transmits the incomplete command to a server running the server side CAx environment 210. The incomplete command is received by the command processing module 212. The command processing module 312 then provides the command to a predictive modeling module 214 within the server side CAx environment 210.

Once the predictive modeling module 214 receives the incomplete command, the predictive modeling module 214 predicts and calculates a predicted resultant action in response to the command based on any already received parameters and a set of predicted parameters in a "CAx system Predicts and Calculates Resultant Action Using Known and Predicted Parameters" block 320. Further, in the prediction block 320, the server side CAx environment 210 applies the predicted resultant action to the collaborative part file 216 stored in the server side CAx environment 210.

After the initial predictions, the server side CAx environment receives at least one actual parameter from the user 220 entering the command in a "CAx system Receives Actual Parameter" block 330. The server side CAx environment 210 then adjusts the predicted resultant action, and applies the adjustment to the collaborative part 216 being operated on in the server side CAx environment 210.

After applying the adjusted predicted resultant action, the CAx environment 210 checks to determine if all the actual parameters for the command have been received in an "Are All Parameters Received?" check 350. If one or more of the parameters have not been received, the method 300 waits for the missing parameter(s). Upon receiving the missing parameters, the method 300 returns to the CAx System Receives Actual Parameter block 330. In this way, the predicted resultant action is iteratively modeled until a full set of actual parameters have been received.

When all the actual parameters have been received, the "Are All Parameters Received?" check 350 returns a yes value, and the method 300 proceeds to propagate the resultant action or actions to a local CAx environment of each user 220, 230.

An additional "Is Command canceled?" check 370 can be performed prior to propagating the resultant action to each user 220, 230. If the check 370 returns a yes, the the method 300 prevents the propagation of the resultant action in a "Prevent Propagation of Resultant Action" block 380. Otherwise, the method proceeds on to the Propagate Resultant Action to Users block 360.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure. Although multiple modules are described, it will be understood that all modules may be implemented as a single code module, or as a hardware circuit, or a combination of software and hardware modules. In some embodiments, the modules may be a combined such that one or more of the modules is implemented in a single software or hardware module.

What is claimed is:

1. A system for facilitating multi-user computer aided design comprising:
   a plurality of locally stored multi-user design (CAx) environments; and
   a hardware server including a server side CAx environment, wherein the hardware server is communicatively coupled to each of said locally stored CAx environments, the server side CAx environment including a plurality of model editing commands, and further including a predictive modeling module operable to receive an incomplete model editing command from a first user, and predict a complete model editing command including one or more predicted omitted parameters based on the incomplete model editing command, wherein the incomplete model editing command is within the plurality of model editing commands;
   wherein said server side CAx environment includes a set of default parameters corresponding to each possible model editing command; and
   altering a collaborative part file in the server side CAx environment according to a predicted resultant action based on the predicted complete model editing command;
   modifying the predicted omitted parameters in response to a received actual parameter thereby determining a new predicted resultant action and altering the collaborative part file in the server side Cax environment according to the new predicted resultant action;
   reiterating the step of modifying the predicted omitted parameters in response to a received actual parameter thereby determining a new predicted resultant action and altering the collaborative part file in the server side CAx environment according, to the new predicted resultant action until all omitted parameters have been replaced with actual parameters; and propagating a visual representation of the resultant collaborative file to each of a plurality of locally stored user Cax environments.

2. The system of claim 1, further comprising a command processing module operable to interface a model editing command from a local CAx environment with said predictive modeling module.

3. The system of claim 2, wherein said command processing module further includes instructions operable to convert a model editing command from a first CAx environment to a model editing command compatible with a server side CAx environment.

4. The system of claim 3, wherein at least one of said local CAx environments is a different CAx environment from said server side CAx environment.

5. The system of claim 1, wherein said server side CAx environment includes a collaborative part file, and wherein each locally stored CAx environment in said plurality of locally stored CAx environments includes a visual representation of the collaborative part file.

6. The system of claim 5, wherein the visual representation of the collaborative part file omits at least some parameters associated with the collaborative part file.

7. The system of claim 5, further comprising an output translation module connecting each of said locally stored CAx environments with said collaborative part file, wherein said output translation module is operable to determine said visual representation of the collaborative part file.

8. The system of claim 1, wherein the set of default parameters is a set of learned parameters based on frequently used parameters.

9. The system of claim 1, wherein at least one of said locally stored CAx environments is directly connected to said server side CAx environment.

10. The system of claim 1, wherein at least one of said locally stored CAx environments is connected to said server side CAx via a network connection.

11. The system of claim 1, wherein the hardware server includes at least a processor and a tangible, non-transitory, memory, and wherein the tangible, non-transitory, memory stores instructions operable to cause the processor to implement the server side CAx environment.

12. A method for reducing lag in a multi-user design (CAx) environment comprising:

predicting at least one parameter of a model editing command using a processor, the model editing command originating from a local computer of the first user, with the local computer of the first user being distinct from the processor, thereby determining a predicted model editing command and performing an action on a collaborative part file using the processor based on the predicted model editing command, wherein the action is at least one modeling operation, and wherein a server housing the processor includes a plurality of model editing commands, and the model editing command originating from the local computer is within the plurality of model editing commands;

iteratively adjusting the predicted model editing command based on at least one subsequently received actual parameter from the first user, and adjusting the performed action based on the subsequently received actual parameter until all actual parameters corresponding to the model editing command have been received; and propagating a visual representation of the collaborative part file to each of a plurality of users when all actual parameters corresponding to the model editing command have been received.

13. The method of claim 12, wherein propagating a representation of the collaborative part file to each of a plurality of users comprises propagating a visual representation, the visual representation including less than all parameters of the collaborative part file.

14. The method of claim 13, further comprising providing a user with at least one omitted parameter in the visual representation in response to the user initiating an action requiring the at least one omitted parameter.

15. The method of claim 12, further comprising deleting a result of said predicted model editing command prior to receiving a final actual parameter in response to receiving a cancel command from the first user.

16. The method of claim 12, wherein predicting at least one parameter of a command originating from a first user comprises accessing one of a set of default parameters and a set of learned parameters corresponding to the model editing command originating from the first user.

17. A method for reducing lag in a multi-user design (CAx) system comprising:

receiving a partial model editing command from a locally stored user CAx environment at a server side CAx environment;

predicting omitted parameters of said partial model editing command, thereby determining a predicted resultant action in response to the partial model editing command, the predicted resultant action being a modeling operation;

altering a collaborative part file in the server side CAx environment according to the predicted resultant action;

modifying the predicted omitted parameters in response to a received actual parameter thereby determining a new predicted resultant action and altering the collaborative part file in the server side CAx environment according to the new predicted resultant action;

reiterating the step of modifying the predicted omitted parameters in response to a received actual parameter thereby determining a new predicted resultant action and altering the collaborative part file in the server side CAx environment according to the new predicted resultant action until all omitted parameters have been replaced with actual parameters; and propagating a visual representation of the resultant collaborative file to each of a plurality of locally stored user CAx environments.

* * * * *